(12) United States Patent
Gibbs

(10) Patent No.: US 10,540,309 B2
(45) Date of Patent: Jan. 21, 2020

(54) APPARATUS AND METHOD FOR COMBINING TRACE DATA FROM A PLURALITY OF TRACE SOURCES

(71) Applicant: ARM Limited, Cambridge (GB)

(72) Inventor: Michael John Gibbs, Fulbourn (GB)

(73) Assignee: ARM Limited, Cambridge (GB)

( * ) Notice: Subject to any disclaimer, the term of this patent is extended or adjusted under 35 U.S.C. 154(b) by 151 days.

(21) Appl. No.: 15/479,556

(22) Filed: Apr. 5, 2017

(65) Prior Publication Data

US 2017/0308491 A1    Oct. 26, 2017

(30) Foreign Application Priority Data

Apr. 20, 2016  (GB) .................................. 1606864.5

(51) Int. Cl.
*G06F 13/362* (2006.01)
*G06F 13/40* (2006.01)
*G05B 19/042* (2006.01)

(52) U.S. Cl.
CPC ...... *G06F 13/3625* (2013.01); *G06F 13/4068* (2013.01); *G05B 19/0423* (2013.01)

(58) Field of Classification Search
None
See application file for complete search history.

(56) References Cited

U.S. PATENT DOCUMENTS

| | | |
|---|---|---|
| 7,373,557 B1 | 5/2008 | Wise et al. |
| 2003/0229823 A1 | 12/2003 | Swaine et al. |
| 2013/0042155 A1 | 2/2013 | Millet et al. |
| 2013/0339802 A1 | 12/2013 | Carlough et al. |
| 2014/0013161 A1 | 1/2014 | Hopkins |
| 2014/0108872 A1 | 4/2014 | Palmer et al. |

OTHER PUBLICATIONS

Combined Search and Examination Report for GB1606864.5 dated Sep. 15, 2016, 6 pages.

*Primary Examiner* — Henry Tsai
*Assistant Examiner* — Aurangzeb Hassan
(74) *Attorney, Agent, or Firm* — Nixon & Vanderhye P.C.

(57) ABSTRACT

An apparatus for combining trace data from a plurality of trace sources has an input interface to receive the trace data, and an output interface to output a trace stream. A network of interconnected funnel elements combines the trace data to produce the trace stream. Each funnel element has an output port and a plurality of input ports arranged to receive trace data either from one of the trace sources, or from an output port of another funnel element in the network, and associated control circuitry to control connection of the input ports to the output port. The control circuitry determines control data indicative of a number of trace sources whose trace data is to be routed through each of the input ports of said funnel element, and controls the timing allocation of the associated funnel element's output port to each input port in dependence on the control data.

13 Claims, 11 Drawing Sheets

APPARATUS AND METHOD FOR COMBINING TRACE DATA FROM A PLURALITY OF TRACE SOURCES

This application claims priority to GB Patent Application No. 1606864.5 filed Apr. 20, 2016, the entire content of which is hereby incorporated by reference.

The present technique relates to an apparatus and method for combining trace data from a plurality of trace sources.

Tracing the activity of a data processing system whereby a stream of trace data is generated to identify certain activities within the system is a highly useful tool in system development. However, in modern data processing systems there can be a significant number of trace sources that each generate trace data that needs to be incorporated within the trace stream that is then output for subsequent analysis.

A series of interconnected funnel elements can be used to combine the trace data from the various trace sources in order to produce an output trace stream. However, the way in which the funnel elements are interconnected will typically influence the bandwidth which is available to each trace source in the output trace stream. Whilst this may not be a problem when a network of interconnected funnel elements is designed specifically for a particular known set of trace sources, it is desirable to design a network of interconnected funnel elements that can be re-used in multiple scenarios, and indeed which can be deployed as a subsystem connected to one or more other subsystems of interconnected funnel elements in order to collectively form the overall network of interconnected funnel elements. In such scenarios, a trace source may end up with an insufficient proportion of the available bandwidth in the trace stream to enable it to output trace data in relation to all of the activities of that trace source that it is desired to trace.

It would be desirable to alleviate such bandwidth issues.

In one example configuration, there is provided an apparatus, comprising: an input interface to receive trace data from a plurality of trace sources; an output interface from which to issue a trace stream incorporating the trace data from each of said plurality of trace sources; a network of interconnected funnel elements to combine the trace data received at the input interface from said plurality of trace sources in order to produce said trace stream; each funnel element having a plurality of input ports and an output port, and having associated control circuitry to control connection of the input ports to the output port, each input port arranged to receive one of trace data from one of said trace sources and trace data output from an output port of another funnel element in said network; the control circuitry being arranged to determine, from information provided by at least one setup transaction received by the control circuitry, control data indicative of a number of trace sources whose trace data is to be routed through each of the input ports of the associated funnel element, and to control a timing allocation of the associated funnel element's output port to each input port in dependence on said control data.

In another example configuration, there is provided a method of operating an apparatus having an input interface to receive trace data from a plurality of trace sources, an output interface from which to issue a trace stream incorporating the trace data from each of said plurality of trace sources, and a network of interconnected funnel elements to combine the trace data received at the input interface from said plurality of trace sources in order to produce said trace stream, each funnel element having a plurality of input ports and an output port, the method comprising: providing associated control circuitry for each funnel element to control connection of the input ports to the output port; arranging each input port to receive one of trace data from one of said trace sources and trace data output from an output port of another funnel element in said network; at each control circuitry: determining, from information provided by at least one setup transaction received by that control circuitry, control data indicative of a number of trace sources whose trace data is to be routed through each of the input ports of the associated funnel element; and controlling a timing allocation of the associated funnel element's output port to each input port in dependence on said control data.

In a yet further example configuration, there is provided an apparatus, comprising: input means for receiving trace data from a plurality of trace sources; output means interface for issuing a trace stream incorporating the trace data from each of said plurality of trace sources; a network of interconnected funnel element means for combining the trace data received at the input means from said plurality of trace sources in order to produce said trace stream; each funnel element means having a plurality of input ports and an output port, and having associated control means for controlling connection of the input ports to the output port, each input port for receiving one of trace data from one of said trace sources and trace data output from an output port of another funnel element means in said network; the control means for determining, from information provided by at least one setup transaction received by the control means, control data indicative of a number of trace sources whose trace data is to be routed through each of the input ports of the associated funnel element means, and for controlling a timing allocation of the associated funnel element means' output port to each input port in dependence on said control data.

The present technique will be described further, by way of example only, with reference to embodiments thereof as illustrated in the accompanying drawings, in which.

Figure 3A:
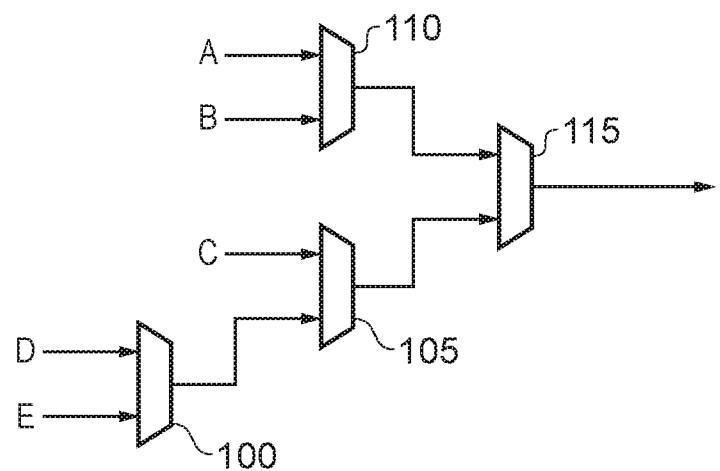
FIGS. 3A to 3C illustrate various example arrangements of interconnected funnel elements which may be provided within the trace interconnect of FIG. 1 in accordance with various embodiments.
Figure 4:
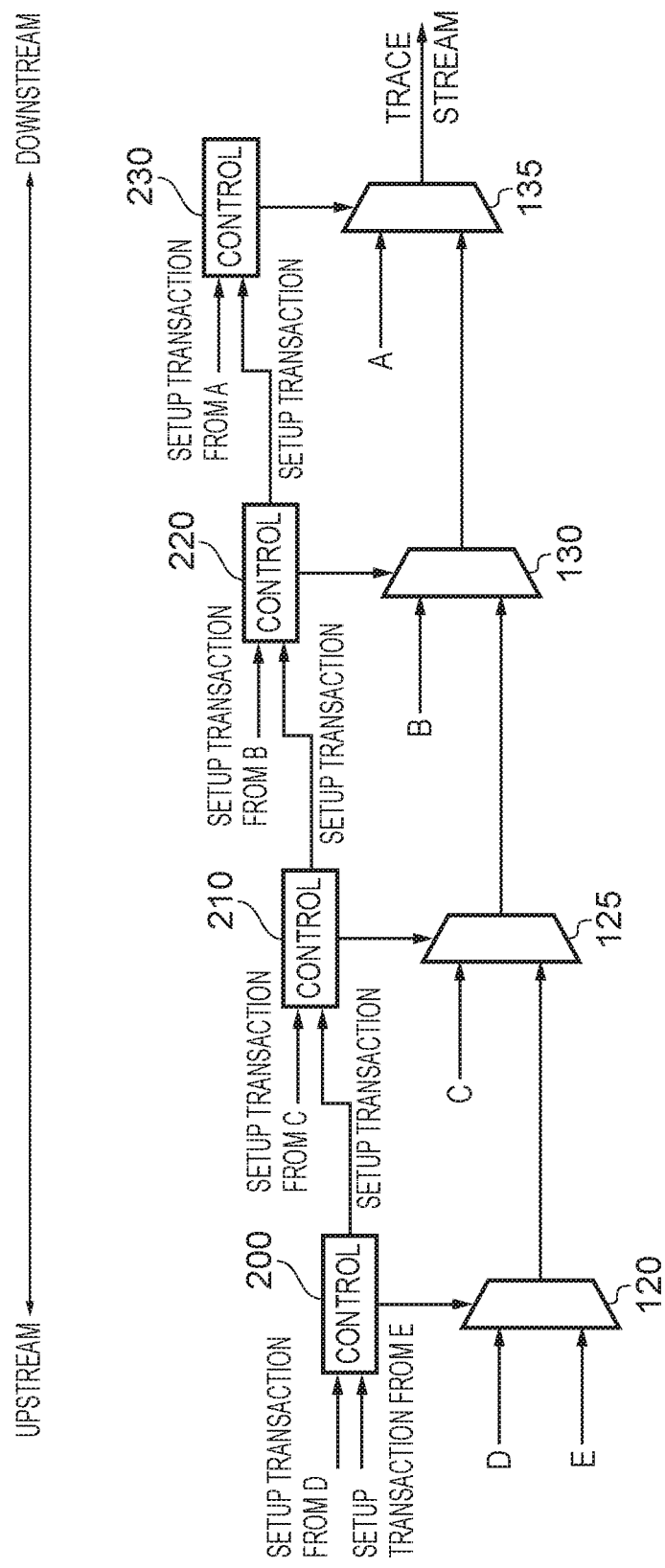
FIG. 4 is a diagram illustrating in more detail the funnel elements and associated control circuits used in accordance with one embodiment.
Figure 8:
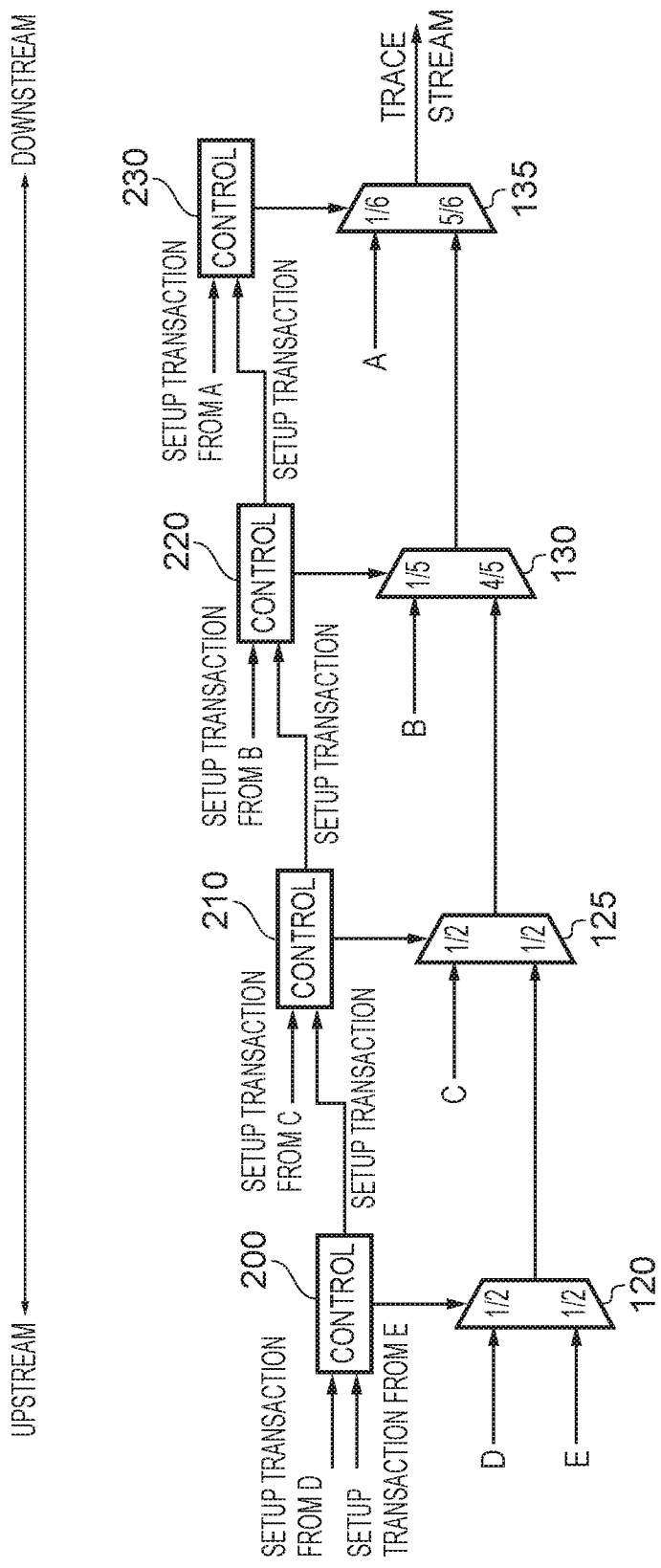
Figure 9:
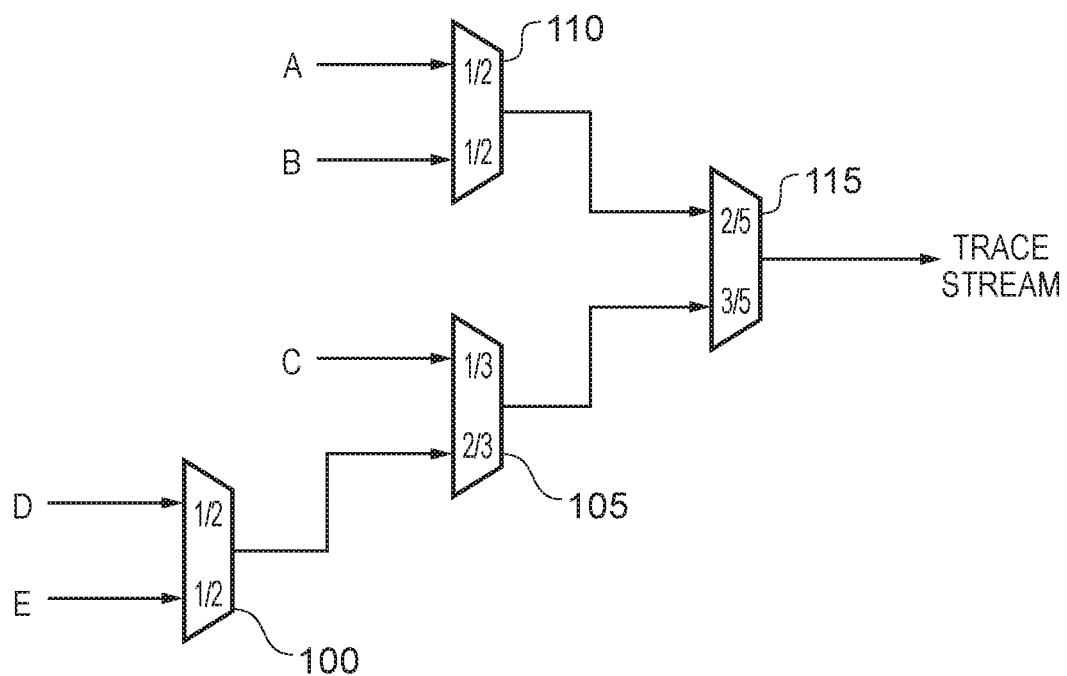

FIG. 8 illustrates how the timing allocations are controlled by the various control circuits of FIG. 4 in accordance with an embodiment where one of the trace sources is given an increased weighting relative to the other trace sources; and FIG. 9 is a diagram schematically illustrating the timing allocations that may be allocated to the network of interconnected funnel elements shown in FIG. 3A in accordance with one embodiment.

Before discussing the embodiments with reference to the accompanying figures, the following description of embodiments is provided.

In one example embodiment, an apparatus is provided that has an input interface to receive trace data from a plurality of trace sources, and an output interface from which to issue a trace stream incorporating the trace data from each of the plurality of trace sources. A network of interconnected funnel elements is used to combine the trace data received at the input interface from the plurality of trace sources in order to produce the trace stream. Each funnel element has a plurality of input ports and an output port, and in addition has associated control circuitry to control connection of the input ports to the output port. Each input port is arranged to receive either trace data from one of the trace sources, or trace data output from an output port of another funnel element in the network. Each control circuit may be arranged to receive at least one setup transaction, and to determine on the basis of that at least one setup transaction control data that is indicative of a number of trace sources whose trace data is to be routed through each of the input ports of the associated funnel element. Using this control data, the control circuit then controls a timing allocation of the associated funnel element's output port to each input port.

By such an approach, the control circuits associated with each of the funnel elements can adjust the timing allocation for each of the funnel elements so as to adjust the bandwidth given to each trace source. As a result, the situation can be avoided where the bandwidth within the trace stream available to any particular trace source is dependent on how that trace source is connected into the network of interconnected funnel elements. Indeed, in one embodiment the control circuitry for each funnel element is arranged to control the timing allocation such that a proportion of the bandwidth of the output interface available to each trace source is independent of topology of the funnel elements within the network.

As a result, the network of interconnected funnel elements can be constructed without regard to the requirements of the individual trace sources to be connected to that network, and instead the control circuits can be arranged to dynamically adjust the timing allocations so as to ensure that each trace source obtains the desired proportion of the bandwidth in the output trace stream.

This gives rise to significant benefits, since it allows pre-existing designs of interconnected funnel elements to be re-used, either alone, or as a building block (subsystem) to be combined with other subsystems in order to form a desired network of interconnected funnel elements. When the trace sources are subsequently connected into the network of interconnected funnel elements, the above-mentioned setup transactions can be issued to the various control circuits in order to cause the timing allocation of the individual funnel elements to be controlled so as to effectively hide the topology of the funnel elements within the network from the trace sources, and instead ensure that the trace sources obtain the desired proportion of the trace stream issued from the output interface.

In one particular embodiment, by such an approach it is possible to dynamically balance the bandwidth given to each trace source such that all enabled trace sources get the same bandwidth at the output interface of the apparatus irrespective of the topology of the interconnected funnel elements. However, in alternative embodiments, certain trace sources can be allocated higher weightings such that those trace sources then get a higher proportion of the bandwidth at the output interface than certain other lower-weighted trace sources.

The setup transactions can be issued for various reasons. In one embodiment, the control circuitry of each funnel element whose output port is connected to an input port of a further funnel element in said network is arranged, in response to at least one trigger condition, to issue the setup transaction to the control circuitry of said further funnel element. Hence, by such an approach a control circuit of a funnel element may issue a setup transaction to the control circuit of an adjacent funnel element under certain conditions, where that adjacent funnel element is arranged to receive as one of its inputs the output from the funnel element whose control circuit issues that setup transaction.

The setup transactions can take a variety of forms, but in one embodiment provide information indicative of a number of the trace sources whose trace data is routed through the funnel element whose control circuitry issued the setup transaction. Hence, if the trace data is considered to flow through the network of interconnected funnel elements from an upstream location to a downstream location (where the input interface connected to the various trace sources represents the most upstream location, and the output interface used to issue the trace stream represents the most downstream location), then it can be seen that by such an approach the control circuitry for a funnel element is able to derive information about the total number of upstream trace sources whose trace data is to be routed through each of the input ports of that associated funnel element. The timing allocation for each input port can then be controlled accordingly, with the overall effect being that the topology of the funnel elements within the network can be effectively hidden from the trace sources.

In one embodiment, at least one of the trace sources whose trace data is routed through the funnel element has a weighting associated therewith, and the information within the setup transaction issued by the control circuitry of that funnel element takes account of said weighting. Hence, by associating different weightings with particular trace sources, it is possible to control the proportion of the bandwidth of the output interface available to each trace source. Hence, in such embodiments the individual trace sources will not all receive the same bandwidth at the output interface. However, it is still the case that the bandwidth available to each trace source is independent of the topology of the funnel elements within the network.

In one embodiment, the at least one setup transaction is issued in response to at least one trigger condition, and the control circuitry of each funnel element is responsive to receiving no setup transaction for one of the input ports of that funnel element within a predetermined time following said at least one trigger condition, to assume, when determining the control data, that trace data from only one trace source is routed through that one of the input ports.

Hence, in such embodiments, whilst setup transactions are issued by the control circuits of any funnel element whose output is provided as an input to an adjacent funnel element, there is no requirement for the individual trace sources to also issue setup transactions. Instead, a control circuit that has not received a setup transaction in respect of one of its funnel element's input ports, within some predetermined period of time following the trigger condition, is arranged to assume that a trace source is connected directly to that input port, and to determine the control data accordingly.

However, in an alternative embodiment, not only are the control circuits of the funnel elements arranged to issue setup transactions, but in addition the input interface is arranged to receive a setup transaction from each trace source responsive to at least one trigger condition. This provides additional flexibility. For example, it allows weightings to be associated with the various trace sources, with that weighting information being provided as part of the setup transaction from the trace source. In addition, there is no requirement to await the lapse of a predetermined period of time before inferring that an input of a funnel element has a trace source directly connected to it, since a setup transaction will be received from that trace source. Also, trace source specific trigger conditions can be accommodated, without the control circuit(s) needing to be aware that such a trigger condition has occurred, since it will receive a setup transaction in such circumstances.

In one embodiment, each setup transaction received by the input interface is routed to the control circuitry whose associated funnel element is arranged to receive the trace data from the trace source issuing that setup transaction. Hence, the control circuitry can respond to the setup transaction from the trace source in the same way as it would respond to a setup transaction received from an interconnected funnel element's control circuit.

There are a number of ways in which the control circuitry may control the timing allocation of the associated funnel element's output port to each input port in dependence on the control data that it determines from the setup transaction (s) that it receives. In one embodiment, the control circuitry is arranged to control the timing allocation by determining, for each input port, a maximum available share of the associated funnel element's output port bandwidth available to that input port, where that maximum share is determined based on the control data's indication of a number of trace sources whose trace data is to be routed through each of the input ports of the associated funnel element. For example, in one embodiment, such an approach allows the bandwidth of the funnel element's output port to be shared equally between the total number of trace sources whose trace data is routed to the input ports of the funnel element. Purely by way of example, if it is assumed that a funnel element has two input ports and one output port, and it is determined that one trace source's trace data is routed through the first input port, but the equivalent of three trace source's trace data is routed through the other port, the first port may receive a quarter of the bandwidth of the output port, whilst the other input port will receive three quarters of the available bandwidth of the output port.

The network of interconnected funnel elements may be formed in a variety of ways. In one embodiment, that network comprises a plurality of interconnected subsystems, where each subsystem comprises at least one funnel element and associated control circuitry. Accordingly, by such an approach, it is possible to construct the network of interconnected funnel elements by connecting together a number of existing subsystems, thereby enabling a network of arbitrary complexity to be constructed in order to support any desired number of trace sources whose trace data needs combining into a single trace stream. Through use of the setup transactions as discussed earlier, it is then possible to hide the topology of the funnel elements within the network from the trace sources, and instead allow the various trace sources to be allocated an appropriate share of the bandwidth available for the output trace stream irrespective of that topology.

The trigger condition that causes a funnel element's control circuit to issue a setup transaction can take a variety of forms. For example, in one embodiment the trigger condition may comprise a network-level event, for example a power-on event for the apparatus, or a start-up event, where the event effectively causes multiple of the control circuits to issue setup transactions. Alternatively, the trigger condition may be receipt of a setup transaction at one of the funnel element's input ports. Hence, in this latter case, the trigger condition may apply to a specific control circuit rather than to multiple of the control circuits.

Similarly, in embodiments where the trace sources also issue setup transactions, the trigger condition that causes a trace source to issue such a setup transaction can take a variety of forms. For example, the trigger condition may again be a network-level event such as a power-on or start-up event. However, alternatively, the trigger condition may be a trace source specific event, such as enablement of the trace source or disablement of the trace source. By such an approach, the trace source can identify when it is enabled or disabled by issuance of a setup transaction to the relevant funnel element's control circuitry. This can cause that funnel element's control circuitry to re-evaluate the control data indicative of the number of trace sources whose trace data is to be routed through the input ports of the associated funnel element, and then timing allocation for the funnel elements output port can be adjusted accordingly.

The information provided by each setup transaction can take a variety of forms, and may for example provide an indication of the number of trace sources, or an indication of a change in a number of trace sources. Hence, by such an approach the number of trace sources can be indicated in either absolute or relative terms, and in either event the control circuitry receiving that setup transaction can re-evaluate its control data and adjust the timing allocation of the associated funnel element's output port accordingly.

Particular embodiments will now be described with reference to the Figures.

Figure 1:
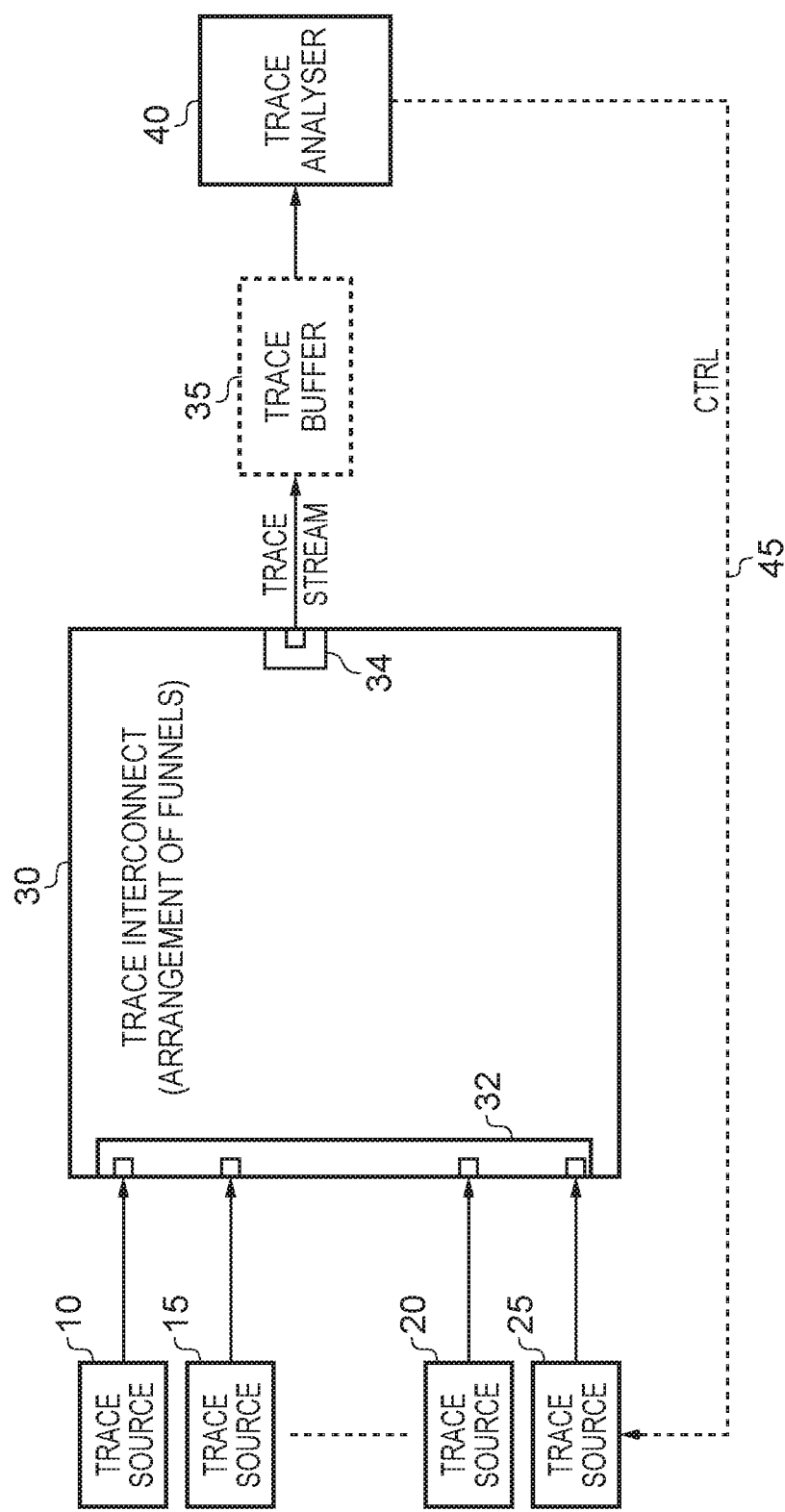
FIG. 1 is a block diagram of a system in accordance with one embodiment.

FIG. 1 is a block diagram of a system in accordance with one embodiment. A plurality of trace sources 10, 15, 20, 25 are arranged to generate trace data that is to be combined into a single trace stream output to a trace analyser 40, optionally via a trace buffer 35. A trace buffer may be used in a variety of instances. For example, where the various trace sources are provided on-chip, the trace stream may be buffered in an on-chip trace buffer 35, from where it is then provided off-chip to an external trace analyser 40. For the purposes of the embodiments described herein, it is not important whether the trace stream is buffered or not prior to being provided to the trace analyser 40.

The trace analyser 40 can take a variety of forms, but in one embodiment may be formed by a general purpose computer running appropriate analyser software.

The trace sources can take a variety of forms. For example, they may be a processor core, an interconnect structure, a power controller, or indeed any other component within the system whose activities are desired to be traced. The trace data output from such trace sources may be produced as those trace sources are performing their usual operations, to represent activities of the various trace sources that are desired to be traced. The trace data can then be combined into a single trace stream for output to the trace analyser where it can then subsequently be analysed for a variety of purposes, for example to facilitate debugging of sequences of processing instructions being executed on a data processing apparatus, for performing profiling operations in order to determine the performance of particular program code, etc.

The trace data produced by a trace source can take a variety of forms. For instance, considering the earlier example where a trace source takes the form of a processor core, the activities that may be desired to be traced may include, but are not limited to, the instructions being executed by the processor core (referred to as instruction trace), and the memory accesses made by those instructions (referred to as data trace). These activities may be individually traced or traced together so that the data trace can be correlated with the instruction trace. The data trace itself may consist of two parts, namely the memory addresses and the data values, referred to (respectively) as data address and data value trace. Existing trace protocols may allow for data address and data value tracing to be enabled independently or simultaneously.

It will hence be appreciated that there are a variety of different types of trace data that may be output by the various trace sources, and some trace sources may produce significant volumes of trace data. As shown in FIG. 1, the trace data output by the various trace sources is combined via a trace interconnect structure 30 in order to form the trace stream output to the trace analyser 40. It is desirable that the trace interconnect is able to provide a sufficient share of the trace stream's bandwidth to each of the various trace sources to enable those trace sources to provide the desired level of trace data required by the trace analyser, but it is also typically desirable to not be required to design dedicated trace interconnect structures for each particular system implementation, but instead it would be desirable to re-use existing trace interconnect blocks to form the trace interconnect 30.

As will be discussed in more detail later, in accordance with the described embodiments the trace interconnect 30 includes an input interface 32 providing a connection interface for receiving the trace data from each of the various trace sources, with that trace data then being routed via a network of interconnected funnel elements in order to produce a trace stream that is output from an output interface 34 for provision to the trace analyser 40 (optionally via an intervening trace buffer 35). As will also be discussed in more detail later, control circuits are provided in association with the various funnel elements, that respond to setup transactions to control the timing allocation of each funnel element's output port to its respective input ports in such a way that the proportion of the bandwidth of the trace stream at the output interface 34 that is available to each trace source 10, 15, 20, 25 is independent of the topology of the funnel elements within the network.

In one embodiment, each of the trace sources can be provided with an equal share of the available trace stream output bandwidth. However, in an alternative embodiment, as illustrated schematically by the dotted line 45, the trace analyser 40 can output weighting information to the various trace sources, with that weighting information then being provided in due course to the control circuits within the trace interconnect 30 via one or more setup transactions so as to enable the proportion of the bandwidth in the trace stream made available to each of the trace sources to be altered dependent on the weighting of each trace source.

Figure 2:
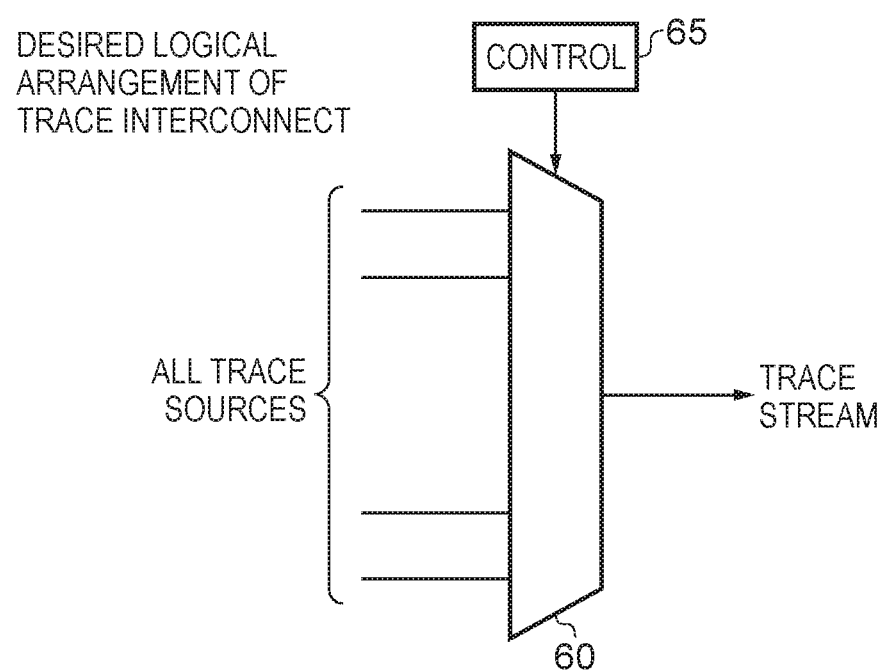
FIG. 2 is a diagram schematically illustrating the desired logical arrangement of the trace interconnect of FIG. 1.

FIG. 2 is a diagram schematically illustrating the desired logical arrangement of the trace interconnect 30 of FIG. 1. In particular, it is desired that the trace interconnect 30 operates as though it is a single wide multiplexer 60 that may be controlled by control element 65 to switch its output (used to produce the desired trace stream issued from the output interface 34) between the various inputs, where each input is connected to one of the trace sources 10, 15, 20, 25. With such an arrangement, the control element can readily be configured so as to give each of the inputs an equal (or desired) share of the output bandwidth within the trace stream.

However, in practice the trace interconnect 30 is not physically constructed in the manner shown in FIG. 2, but instead is constructed as a network of interconnected funnel elements, where each funnel element has multiple input ports and an output port.

For example, FIG. 3A illustrates one example network of funnel elements 100, 105, 110, 115. Via such a network, the five trace sources A, B, C, D and E may be connected for example in the manner shown in FIG. 3A so that the trace data produced by each of those five trace sources can be combined into a single trace stream output from the funnel element 115. It will be appreciated that if each of the funnel elements is arranged to give its inputs an equal share of its output, then the maximum share of the bandwidth available to each of the trace sources is as shown in Table 1 below.

TABLE 1

| Source | Share of the bandwidth |
|---|---|
| A | 25% |
| B | 25% |
| C | 25% |
| D | 12.5% |
| E | 12.5% |

As a result, it can be seen that if the trace sources A, B and C make maximum use of their available share of the bandwidth, this can potentially cause trace sources D and E to be starved of bandwidth in the trace stream, which could be problematic if either trace source D or trace source E has a significant volume of trace data that it wishes to output.

Figure 3B:
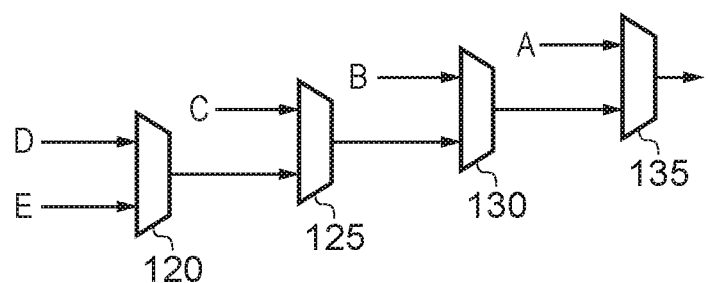

FIG. 3B illustrates another example network of interconnected funnel elements 120, 125, 130, 135. Again, such an arrangement allows the trace data from the five trace sources A, B, C, D and E to be combined into a single trace stream. Assuming each funnel element gives its inputs an equal share of its output, then the maximum share of the bandwidth within the trace stream available to each trace source is as given in Table 2 below:

TABLE 2

| Source | Share of the bandwidth |
|---|---|
| A | 50% |
| B | 25% |
| C | 12.5% |
| D | 6.3% |
| E | 6.3% |

Figure 3C:
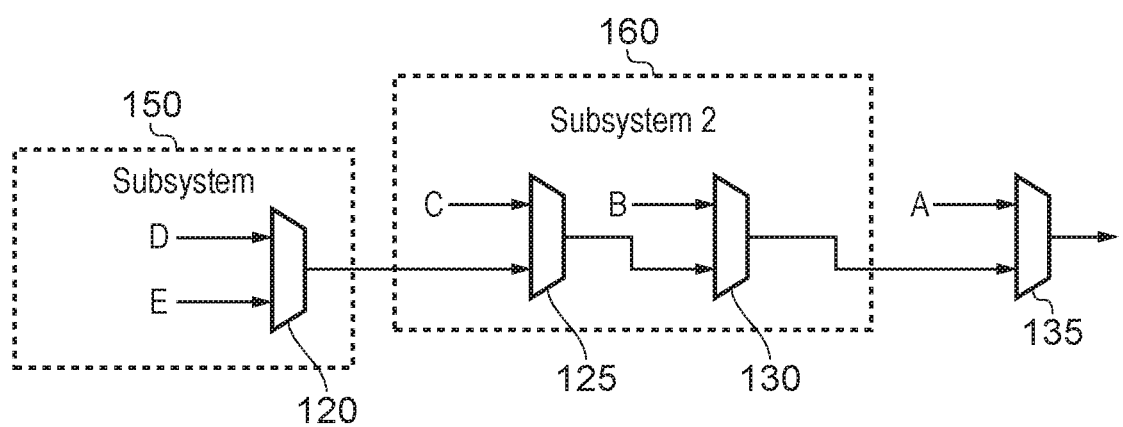

Again, it will be seen that certain of the trace sources may potentially be starved of bandwidth within the trace stream, assuming the other trace sources utilise their maximum allowed share.

Where the network of interconnected funnel elements is designed specifically having regard to the specific trace sources that are to be connected to it, then how the various trace sources are connected into the network can be taken into account in order to seek to alleviate such issues. However, as illustrated in FIG. 3C, it is desirable to be able to construct networks of interconnected funnel elements from pre-existing building blocks (referred to herein as subsystems) so as to improve the re-usability of existing designs. Hence, FIG. 3C illustrates a network that is equivalent to that which is shown in FIG. 3B, but where the funnel element 120 exists within a first subsystem 150 that is then connected a second subsystem 160 that includes the funnel elements 125 and 130. The output from the second subsystem 160 is then provided to one input of a final funnel element 135.

Whilst the individual topology of each separate subsystem may be entirely suitable for the original purpose the subsystem was designed for, when subsystems are connected together as shown for example in FIG. 3C, this can have unforeseen adverse effects on the effectiveness of the trace mechanism. This can be illustrated by way of example if we assume for instance that the first subsystem 150 (containing trace sources E and D) is a compute cluster, and hence for example each of the trace sources E and D is a processor core with an associated Embedded Trace Macrocell (ETM) used to produce trace data for the associated processor core. As mentioned earlier, significant volumes of trace data may be produced from each such processor core, for example to output the instruction trace and data trace components discussed earlier. If we then assume, by way of example, that the second subsystem (containing trace sources C and B) represents an interconnect, and that the trace source A is a power controller, then Table 3 below may provide an illustrative example of the desired bandwidth of each trace source and the actual maximum available share of the bandwidth:

TABLE 3

| Source | Desired bandwidth | Actual share of the bandwidth |
|---|---|---|
| A | 5% | 50% |
| B | 10% | 25% |
| C | 10% | 12.5% |
| D | 37.5% | 6.3% |
| E | 37.5% | 6.3% |

As discussed above, each of the trace sources D and E may be producing a significant amount of trace data. In the specific example shown in Table 3, this can be accommodated because each of the trace sources A, B and C only require a relatively small amount of the available trace bandwidth. However, if instead one of the trace sources A, B or C is replaced with a high bandwidth trace source, such as another processor core and associated ETM, then this could cause trace sources D and E to be significantly starved of bandwidth, reducing their effectiveness, for example by inhibiting them outputting all of the trace data that the trace analyser 40 wishes to receive from those trace sources D and E.

As will be discussed in more detail with reference to the remaining figures, in accordance with the described embodiments this potential problem is alleviated by providing control circuits in association with each of the funnel elements, that are responsive to setup transactions to dynamically balance the bandwidth given to each trace source so as to effectively hide the topology of the network of interconnected funnel elements from the trace sources, and instead to allow each trace source to obtain the desired proportion of the overall trace stream bandwidth.

This technique is illustrated by way of example with reference to FIG. 4, which shows the topology of FIGS. 3B/3C being adopted, but with each of the funnel elements 120, 125, 130, 135 having an associated control circuit 200, 210, 220, 230 that operates in dependence on setup transaction information received from upstream components. As shown in FIG. 4, those components nearer the trace sources are referred to as upstream components, and those components nearer the output interface 34 of the trace interconnect are referred to as downstream components. Hence, considering the funnel element 125, it receives as one of its inputs the output from an upstream funnel element 120. Similarly, the output from the funnel element 125 is provided as an input to a downstream funnel element 130.

In the example illustrated in FIG. 4, it is assumed that each of the control circuits 200, 210, 220, and each of the trace sources A, B, C, D and E, issue setup transactions in response to at least one trigger condition. The trigger condition may be a network-level event, such as a power-on condition, at which point each of the sources and each of the control circuits will issue a setup transaction, or may be a more local trigger condition affecting only one or a subset of the control circuits and/or trace sources.

The setup transaction from each trace source may be issued to the control circuit associated with the funnel element that is arranged to receive the trace data from that trace source. Accordingly, it can be seen that the control circuit 200 will receive setup transactions from trace sources D and E. Similarly, the control circuit 210 will receive a setup transaction from trace source C, the control circuit 220 will receive a setup transaction from trace source B and the control circuit 230 will receive a setup transaction from trace source A. A setup transaction from each source will effectively identify the presence of the trace source as one of the inputs to the associated funnel element. More generally, as will be discussed later with reference to the setup transactions issued by the control circuits, the setup transaction provides an indication of the number of trace sources whose trace data will be routed to the corresponding input of the funnel element whose control circuit receives that setup transaction. When the setup transaction comes from a trace source itself, this may effectively identify that there is a single trace source being routed through the corresponding input of the funnel element. However, in embodiments where trace sources are provided with individual weightings, then the weighting information can be included in the setup transaction, and hence the "effective number" of trace sources associated with a particular input may differ from one. For example, if trace source D is given a weighting of two and all of the other trace sources are given a weighting of one, then the setup transaction from trace source D will identify to the control circuit 200 that it should consider there to be effectively two trace sources providing trace data through the first input of the associated funnel element 120.

Each time a control circuit receives a setup transaction, it will determine control data indicative of the number of trace sources whose trace data is to be routed through each of the input ports of the associated funnel element. It will then control the timing allocation of the associated funnel element's output port to each input port in dependence on that control data. For example, if control circuit 200 receives a setup transaction from each of the trace sources D and E, and both trace source D and trace source E have the same weight, then it will allocate each of the inputs of the funnel element 120 50% of the output bandwidth from the funnel element 120.

In addition, the control circuit will then issue a setup transaction to the control circuit associated with an interconnected funnel element. Accordingly, as shown in FIG. 4, the control circuit 200 associated with the funnel element 120 will issue a setup transaction to the control circuit 210 associated with the funnel element 125, since the funnel element 125 receives as one of its inputs the output from the funnel element 120. In the example shown in FIG. 4, if both trace sources D and E have an equal weighting, then the setup transaction issued from the control circuit 210 may identify that two trace sources have trace data that will be routed to the second input of the funnel element 125. If the setup transaction from trace source C that is also received by the control circuit 210 indicates a single trace source (for example because the trace source C has a weighting of one), then the timing allocation for the output of the funnel element 125 will be controlled by the control circuit 210 so that the upper input (receiving trace data from trace source C) receives a third of the output bandwidth, whilst the second input (receiving the output from the funnel element 120) receives two-thirds of the bandwidth (assuming that trace sources D and E have an equal weighting to trace source C).

As shown in FIG. 4, setup transactions will ripple through the entire network of interconnected funnel elements, from one control circuit to the next, allowing each control circuit to determine control data that is then used to control the timing allocation of the associated funnel element's output port to each of its input ports. By such an approach, it is possible to allocate each of the trace sources an appropriate proportion of the bandwidth of the output trace stream, in a manner that is independent of the actual topology of the funnel elements within the network, i.e. independently of the way in which the various funnel elements are interconnected.

Figure 5:
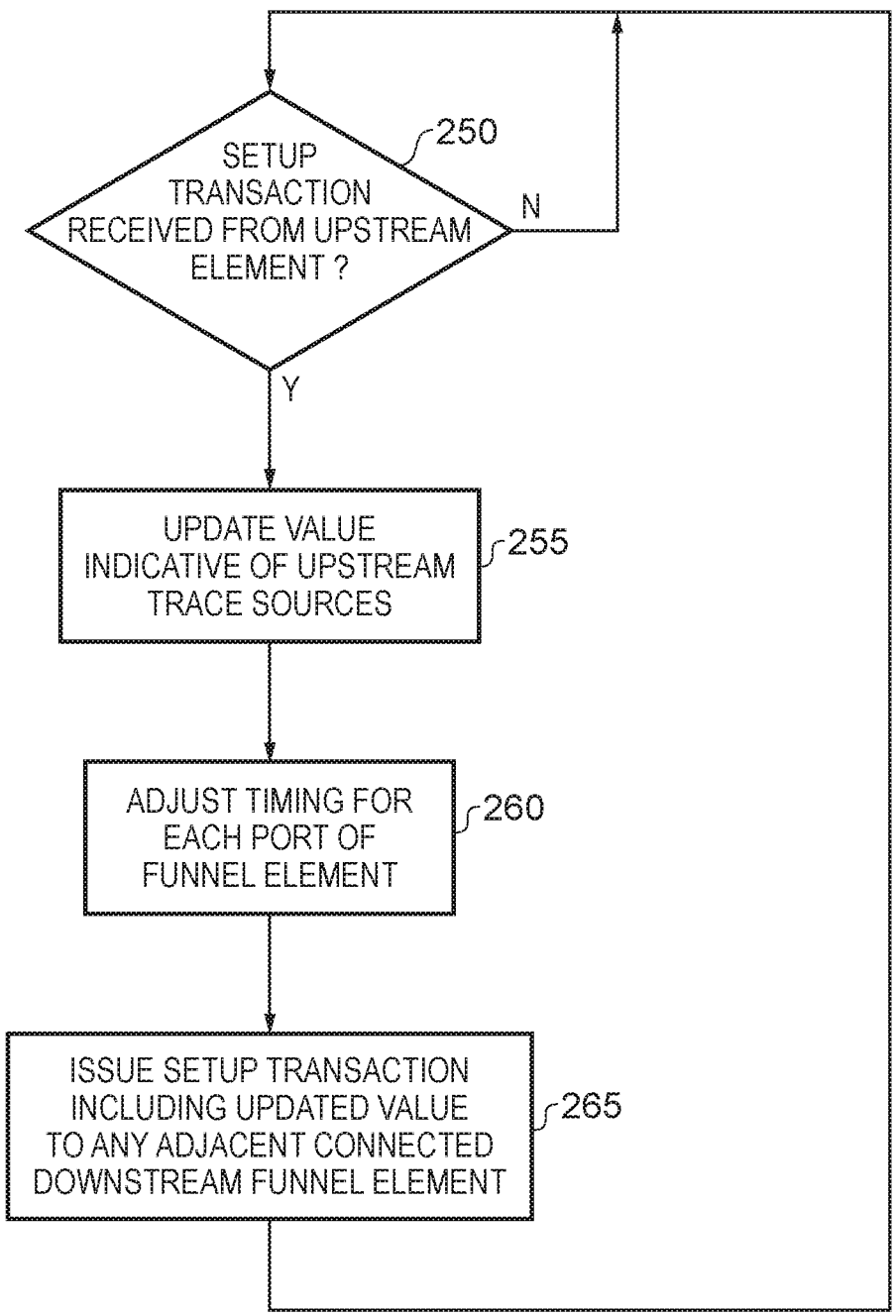
FIG. 5 is a flow diagram illustrating the operation of each of the control circuits of FIG. 4 in accordance with one embodiment.

FIG. 5 is a flow diagram illustrating the steps performed within each control circuit upon receipt of a setup transaction. At step 250 it is determined whether a setup transaction has been received from an upstream element. As will be apparent from the earlier discussion of FIG. 4, the upstream element could be a trace source, or it could be a control circuit for another funnel element within the network, in particular a funnel element whose output is being provided as an input to the funnel element being controlled by the control circuit performing the process of FIG. 5.

When a setup transaction is determined to have been received, then at step 255 the control circuit updates a value (or values) that it maintains indicative of the number of upstream trace sources whose trace data will be routed through each of the input ports of the associated funnel element. Thereafter, at step 260, the control circuit adjust the timing for each input port of the associated funnel element based on the updated value(s) determined at step 255. This will then control the proportion of the output bandwidth from the funnel element that is allocatable to each of the inputs of that funnel element.

At step 265, the control circuitry (assuming it is not the control circuit for the final funnel element in the network) then issues a setup transaction including the updated value determined at step 255, to the control circuitry for any adjacent connected downstream funnel element. In one embodiment, the value provided within the setup transaction at step 265 is a cumulative value representative of the total number of trace sources whose trace data is passing through the associated funnel element, whereas at step 260 information is used about the number of trace sources using each input of the funnel element in order to adjust the timing of each input port accordingly.

Figure 6:
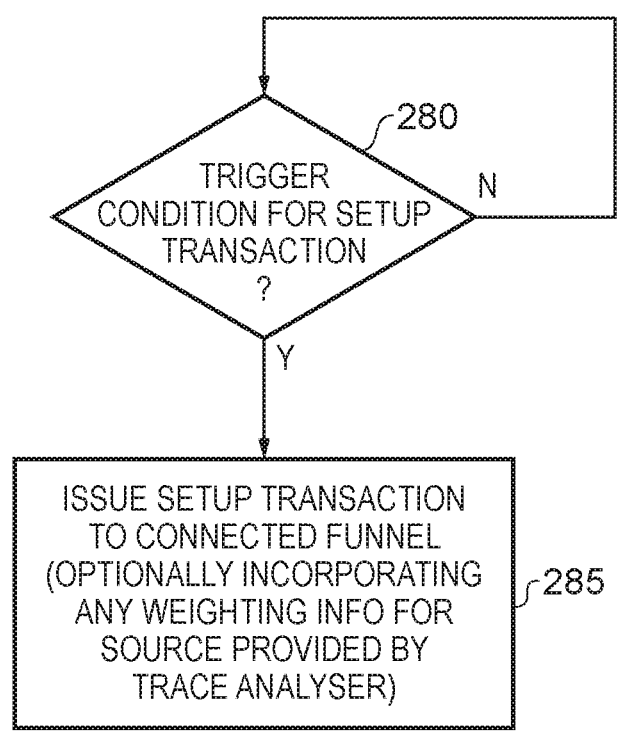
FIG. 6 is a flow diagram illustrating steps that may be performed within each trace source of FIG. 1 in accordance with one embodiment.

FIG. 6 illustrates steps that may be performed within each trace source in order to issue a setup transaction. At step 280, it is determined whether a trigger condition for a setup transaction has arisen. As mentioned earlier, the trigger condition may be a global, network-level, event such as a power-on or start-up event. Alternatively, it could be a more local event, such as the trace source being enabled, or the trace source being disabled. Upon occurrence of the trigger condition, then at step 285 the trace source issues a setup transaction to a connected funnel element to effectively identify its presence or absence, along with any weighting information. For example, the setup transaction may identify that the associated trace source is active, and provide any weighting information to enable the control circuit to determine the effective number of trace sources associated with the corresponding input of the funnel element controlled by that control circuit. If the setup transaction is issued both when a source is enabled and when a source is disabled, it will be appreciated that the control circuit can update its internally maintained value indicative of the number of trace sources associated with the corresponding input of the funnel element dependent on whether the source is enabled or disabled.

As will be apparent from the earlier discussed FIG. 5, when a setup transaction is issued from one of the trace sources, the relevant control circuit will not only adjust its own local timing for its associated funnel element, but will also itself issue a setup transaction to the adjacent downstream control circuit, thereby causing a dynamic timing adjustment in respect of each of the downstream funnel elements within the network.

Whilst in the above embodiments it is assumed that each trace source will issue setup transactions, this is not a requirement in all embodiments. Instead, whilst the control circuits will themselves issue setup transactions, it may be the case that the individual trace sources do not. For example, if each of the trace sources is always assumed to have an equal weight, then following a network level trigger condition, each control circuit may be arranged to deduce that one of its inputs is directly connected to a trace source if it is does not receive any setup transaction within a predetermined period of time after that trigger condition occurs. It will effectively then determine that a single trace source is connected to that input, and adjust its maintained value of the number of trace sources associated with each input of the corresponding funnel element accordingly. It can also then issue a setup transaction to the downstream control circuit to cause a corresponding adjustment to take place in respect of the downstream funnel element.

Figure 7A:
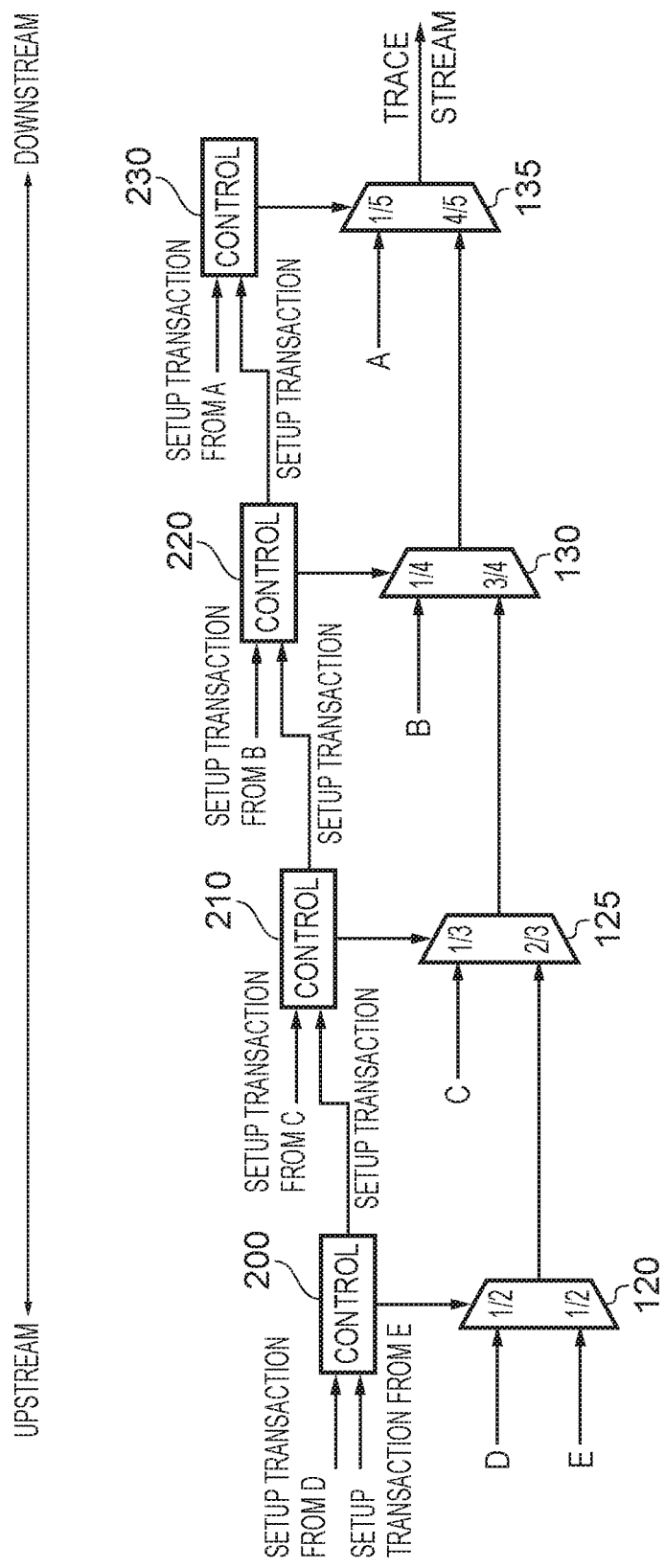
FIGS. 7A to 7C illustrate how the control circuits of FIG. 4 control the timing allocation for each of their associated funnel elements dependent on the various set up transactions received by those control circuits in accordance with one embodiment.

FIG. 7A schematically illustrates the weightings given to each of the inputs of each of the funnel elements 120, 125, 130, 135 following a start-up network-level event, and after all of the setup transactions have been issued and processed by the relevant control circuits 200, 210, 220, 230. In this example, it is assumed that each of the trace sources has an equal weighting. The fractions indicated in association with each of the inputs of each funnel element identify the proportion of the output bandwidth of that funnel element allocated to the corresponding input. Hence, considering the funnel element 120, each of the trace sources D, E receives half of the output bandwidth. However, when considering the funnel element 125, since the setup transaction received by the control circuit 210 from the control circuit 200 identified that the trace data from two trace sources will be passing through the second input of the funnel element 125, the control circuitry 210 allocates the first input a third of the bandwidth and the second input two-thirds of the bandwidth.

For a similar reason the control circuit 220 allocates its first input a quarter of the output bandwidth and the second input three-quarters of the output bandwidth. Further, the control circuit 230 then allocates the first input of its associated funnel element 135 a fifth of the output bandwidth and the second input four-fifths of the output bandwidth. As a result, it can be seen that through the propagation of the setup transactions, the trace interconnect 30 dynamically balances the bandwidth given to each trace source such that all of the available trace sources get the same bandwidth within the trace stream irrespective of the topology of the funnel elements within the trace interconnect.

Figure 7B:
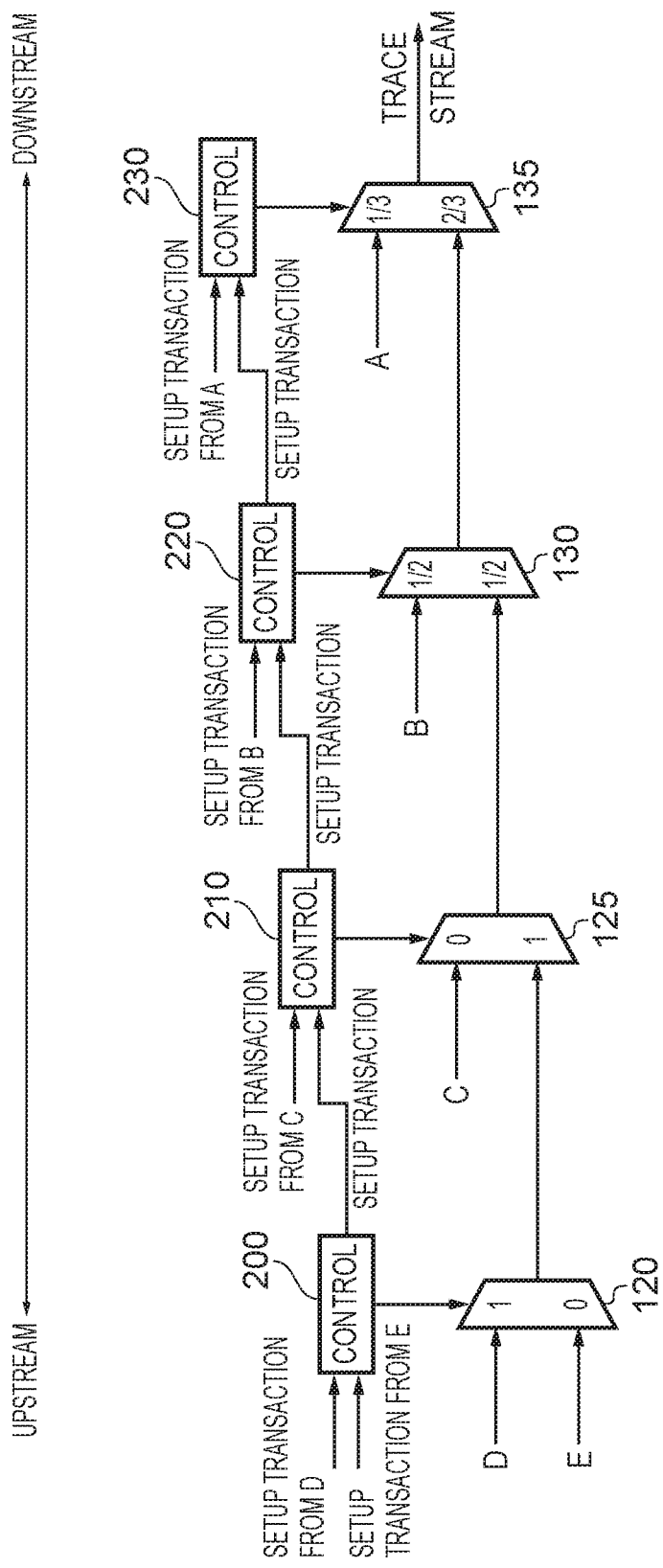
Figure 7C:
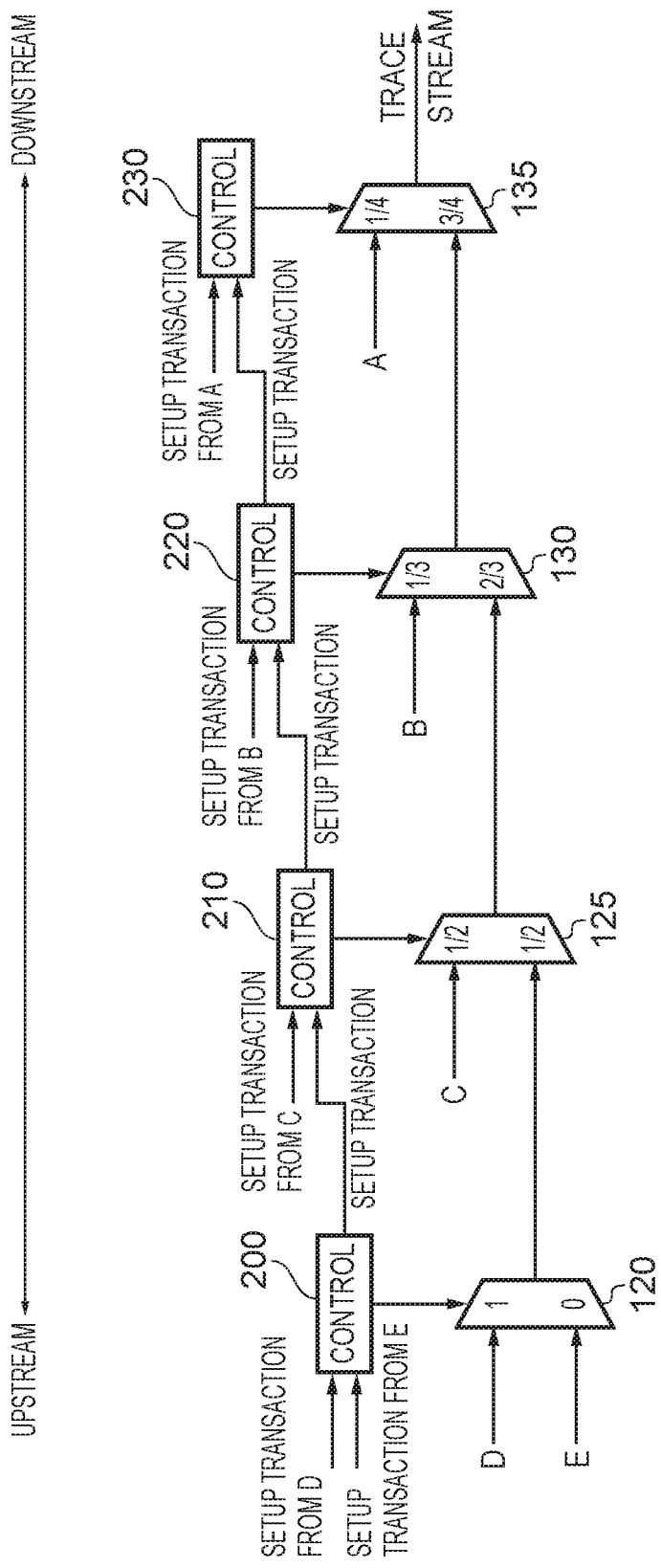

The dynamic nature of the setup can be illustrated further by way of example with reference to FIGS. 7B and 7C. In FIG. 7B, it is assumed that, following establishment of the timing shown in FIG. 7A, trace sources C and E are disabled and issue corresponding setup transactions to the control circuits 200, 210 to identify that they have been disabled. After the associated setup transactions have been processed, including the setup transactions from each of the control circuits 200, 210, 220 that are triggered from the change in status of trace sources C and E, then the bandwidth is allocated as shown in FIG. 7B. In particular, with regard to funnel element 120, trace source D is allocated all of the available output bandwidth. Similarly, considering funnel element 125, the output from the funnel element 120 is allocated all of the output bandwidth from the funnel element 125. Further, the setup transaction issued from the control circuit 210 to the control circuit 220 will indicate that the trace data received at the second input of the funnel element 130 is from only a single trace source, and accordingly the control circuit 220 will allocate each input of the funnel element 130 half of the output bandwidth. Thereafter, with regards to the final funnel element 135, a third of the output bandwidth will be allocated to the first input and two-thirds will be allocated to the second input. As a result, the timing is adjusted so that the bandwidth is balanced equally amongst the three remaining enabled trace sources.

In FIG. 7C it is assumed that trace source C has been re-enabled, whilst trace source E remains disabled. As a result, no change is required by the control circuit 200, but when the control circuit 210 receives a setup transaction from trace source C to identify that it is now enabled, it adjusts the associated timing of its funnel element 125 so that each of the inputs receives half of the output bandwidth. It also issues a setup transaction to the control circuit 220, which causes the control circuit 220 to alter its timing so that its associated funnel element gives a third of the output bandwidth to its first input and two-thirds of the available bandwidth to its second input. Further, an additional setup transaction is issued to the control circuit 230 from the control circuit 220, which causes a change in the timing of the associated funnel element 135 as shown in FIG. 7C. Again, this causes a dynamic rebalancing of the bandwidth so that the four active trace sources then have an equal share of the output bandwidth within the trace stream.

FIG. 8 illustrates an example situation analogous to FIG. 7A but where trace source C is given a weighting equivalent to two sources. After all of the setup transactions have been issued and processed, then the weightings given to each of the inputs of each of the funnel elements 120, 125, 130, 135 is as shown in FIG. 8. In particular, when considering the funnel element 125, the first input is allocated half of the available bandwidth, given that trace source C has a weighting equivalent to two sources. This then has a knock-on effect to the allocations made for the funnel elements 130, 135, as shown in FIG. 8.

FIG. 9 illustrates by way of example the timing allocations given to each of the funnel elements 100, 105, 110, 115 when using the topology of FIG. 3A, assuming that all of the trace sources have an equal weighting. The fractions shown within each of the funnel elements show the proportion of the output bandwidth of those funnel elements allocated to the respective inputs once all of the setup transactions have been issued and processed. By such an approach, it can be seen that each of the five trace sources are allocated an equal proportion of the output bandwidth of the trace stream as a result of the dynamic balancing that occurs due to the adjustments made by the control circuits in response to the setup transactions that they receive.

By such an approach, it can be seen that the network of funnel elements is arranged to be dynamically aware of its own configuration. In particular, via use of the setup transactions, the associated control circuits adapt the weighting given to each funnel element input so as to ensure that all of the trace sources have an equal share of the available bandwidth within the final trace stream produced. In some embodiments, where the trace sources are given relative weightings, then the trace sources do not have an equal share of the available bandwidth, but have a share that reflects the weighting given to those trace sources. In both cases, the share of the available bandwidth within the trace stream allocated to each trace source is independent of the topology of the funnel elements.

In one embodiment, it will be appreciated that each of the funnel elements (including its associated control circuit) receives one or more setup transactions indicative of the number of trace sources connected upstream from each of its input ports. An indication of the total number of trace sources is then passed as a setup transaction to the funnel element(s) downstream. The control circuit of each funnel element may then be arranged to allocate to each input port some predetermined minimum time multiplied by the number of sources connected to that input port, so as to allocate a proportion of each funnel element's output bandwidth to each input port of the funnel element.

Whilst in one embodiment each setup transaction indicates the total number of sources that are connected upstream, in an alternative embodiment each setup transaction can indicate a change in the total rather than the absolute value. For example, such an arrangement can be employed when each of the trace sources is arranged to issue a setup transaction to indicate when it is enabled, and to indicate when it is disabled (either by programming or entering a low power mode, etc.). Through use of such enable/disable information, each control circuit can update the value it maintains indicative of the number of trace sources whose trace data is passing through each input port of the associated funnel element, and can then adjust the timing allocations accordingly. Through the propagation of setup transactions through the remaining downstream components, each downstream funnel element's timing allocation is also adjusted accordingly.

The described techniques hence provide an effective mechanism for allocating bandwidth in the output trace stream to each of the trace sources in a manner which is independent of the topology of the funnel elements used to combine the trace data from the various trace sources into the single trace stream.

Whilst for ease of illustration the specific embodiments described earlier only show a relatively small number of funnel elements within the network, it will be appreciated that in practice there may be a large number of funnel elements in the network, and the described techniques can be applied to any size of trace interconnect network.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
   an input interface to receive trace data from a plurality of trace sources;
   an output interface from which to issue a trace stream incorporating the trace data from each of said plurality of trace sources;
   a network of interconnected funnel elements to combine the trace data received at the input interface from said plurality of trace sources in order to produce said trace stream;
   each funnel element having a plurality of input ports and an output port, and having associated control circuitry to control connection of the input ports to the output port, each input port arranged to receive one of trace data from one of said trace sources and trace data output from an output port of another funnel element in said network;
   the control circuitry being arranged to determine, from information provided by at least one setup transaction received by the control circuitry, control data indicative of a number of trace sources whose trace data is to be routed through each of the input ports of the associated funnel element, and to control a timing allocation of the associated funnel element's output port to each input port in dependence on said control data;
   wherein the control circuitry for each funnel element is arranged to control the timing allocation such that a proportion of the bandwidth of the output interface available to each trace source is independent of topology of the funnel elements within the network.

2. An apparatus as claimed in claim 1, wherein:
   said at least one setup transaction is issued in response to at least one trigger condition; and
   the control circuitry of each funnel element is responsive to receiving no setup transaction for one of the input ports of that funnel element within a predetermined time following said at least one trigger condition, to assume, when determining the control data, that trace data from only one trace source is routed through that one of the input ports.

3. An apparatus as claimed in claim 1, wherein the input interface is arranged to receive a setup transaction from each trace source responsive to at least one trigger condition.

4. An apparatus as claimed in claim 3, wherein each setup transaction received by the input interface is routed to the control circuitry whose associated funnel element is arranged to receive the trace data from the trace source issuing that setup transaction.

5. An apparatus as claimed in claim 1, wherein the control circuitry is arranged to control the timing allocation by determining, for each input port, a maximum available share of the associated funnel element's output port bandwidth available to that input port, where that maximum share is determined based on the control data's indication of a number of trace sources whose trace data is to be routed through each of the input ports of the associated funnel element.

6. An apparatus as claimed in claim 1, wherein the network of interconnected funnel elements comprises a plurality of interconnected subsystems, where each subsystem comprises at least one funnel element and associated control circuitry.

7. An apparatus as claimed in claim 1, wherein:
   the control circuitry of each funnel element whose output port is connected to an input port of a further funnel element in said network is arranged, in response to at least one trigger condition, to issue the setup transaction to the control circuitry of said further funnel element; and
   for each control circuitry, said at least one trigger condition that causes that control circuitry to issue a setup transaction comprises at least one of:
   a network-level event; and
   receipt of a setup transaction at one of the funnel element's input ports.

8. An apparatus as claimed in claim 1, wherein:
   the input interface is arranged to receive a setup transaction from each trace source responsive to at least one trigger condition; and
   for each trace source, said at least one trigger condition that causes that trace source to issue a setup transaction comprises at least one of:
   a network-level event;
   an enablement of the trace source; and
   a disablement of the trace source.

9. An apparatus as claimed in claim 1, wherein the information provided by each setup transaction provides one of:
   an indication of a number of trace sources; and
   an indication of a change in a number of trace sources.

10. A method of operating an apparatus having an input interface to receive trace data from a plurality of trace sources, an output interface from which to issue a trace stream incorporating the trace data from each of said plurality of trace sources, and a network of interconnected funnel elements to combine the trace data received at the input interface from said plurality of trace sources in order to produce said trace stream, each funnel element having a plurality of input ports and an output port, the method comprising:
   providing associated control circuitry for each funnel element to control connection of the input ports to the output port;
   arranging each input port to receive one of trace data from one of said trace sources and trace data output from an output port of another funnel element in said network;
   at each control circuitry:
   determining, from information provided by at least one setup transaction received by that control circuitry, control data indicative of a number of trace sources whose trace data is to be routed through each of the input ports of the associated funnel element; and controlling a timing allocation of the associated funnel element's output port to each input port in dependence on said control data, such that a proportion of the bandwidth of the output interface available to each trace source is independent of topology of the funnel elements within the network.

11. An apparatus, comprising:
an input interface to receive trace data from a plurality of trace sources;
an output interface from which to issue a trace stream incorporating the trace data from each of said plurality of trace sources;
a network of interconnected funnel elements to combine the trace data received at the input interface from said plurality of trace sources in order to produce said trace stream;
each funnel element having a plurality of input ports and an output port, and having associated control circuitry to control connection of the input ports to the output port, each input port arranged to receive one of trace data from one of said trace sources and trace data output from an output port of another funnel element in said network;
the control circuitry being arranged to determine, from information provided by at least one setup transaction received by the control circuitry, control data indicative of a number of trace sources whose trace data is to be routed through each of the input ports of the associated funnel element, and to control a timing allocation of the associated funnel element's output port to each input port in dependence on said control data;
wherein the control circuitry of each funnel element whose output port is connected to an input port of a further funnel element in said network is arranged, in response to at least one trigger condition, to issue the setup transaction to the control circuitry of said further funnel element.

12. An apparatus as claimed in claim 11, wherein the setup transaction provides information indicative of a number of the trace sources whose trace data is routed through the funnel element whose control circuitry issued the setup transaction.

13. An apparatus as claimed in claim 12, wherein at least one of the trace sources whose trace data is routed through the funnel element has a weighting associated therewith, and the information within the setup transaction issued by the control circuitry of that funnel element takes account of said weighting.

* * * * *